UNITED STATES PATENT OFFICE.

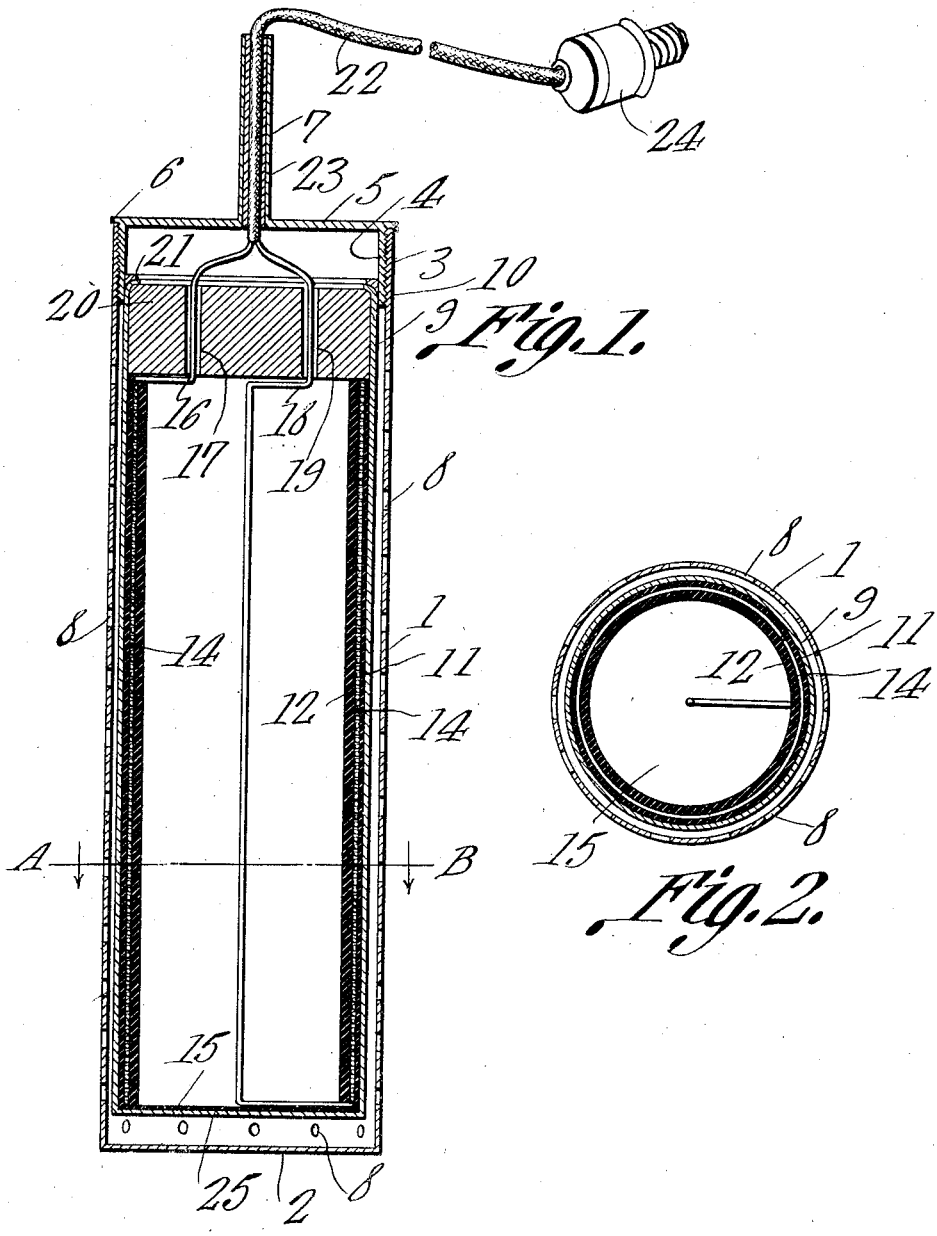

CHARLES O. FARRINGTON AND HIRAM M. HILL, OF DALLAS, TEXAS.

ELECTRIC WATER-HEATER.

1,002,977.     Specification of Letters Patent.     Patented Sept. 12, 1911.

Application filed November 8, 1910. Serial No. 591,238.

*To all whom it may concern:*

Be it known that we, CHARLES O. FARRINGTON and HIRAM M. HILL, citizens of the United States, residing at Dallas, in the county of Dallas, State of Texas, have invented a new and useful Electric Water-Heater, of which the following is a specification.

It is the object of this invention to provide, in a merchantable and inexpensive form, an electric water heater which will present a maximum heating surface.

Another object of the invention is to provide an electric water heater into the interior of which the water cannot penetrate.

Another object of the invention is to provide an electric water heater, the heating unit of which is suitably housed within a protecting casing, the construction being such that the heating unit may readily be removed from the casing in which it is inclosed.

With the foregoing and other objects in view which will appear as the description proceeds the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a longitudinal section wherein sundry parts appear in elevation; and Fig. 2 is a transverse section on the line A—B of Fig. 1 looking in the direction of the arrows.

In carrying out the invention there is provided as a primary and fundamental element a metal casing 1 preferably nickel plated and closed at one end as denoted by the numeral 2. The casing 1 is provided in its interior and at its open end with threads 3, adapted to receive similar threads upon the outer face of a flange 4 of a cap the flange 4 depending from the top 5 of the cap the top 5 overhanging the end of the casing 1, as shown at 6. The outer casing 1 is perforated as shown at 8 so that the liquid which is to be heated may readily circulate between the outer casing and the heat unit (hereinafter described) which is located within the outer casing 1.

The inner casing 9 is preferably fashioned from thin copper. This inner casing 9 is of less diameter than the outer casing 1, so that a water space exists between the casings. Moreover, the inner casing 9 is shorter than the outer casing 1, whereby the water may circulate within the outer casing 1, beneath the end of the inner casing 9, this latter casing being closed at one end, as shown at 25, after the manner of the outer casing 1. The open end of the inner casing 9 fits closely within the open lower end of the flange 4 of the cap, the inner casing 9 being brazed or soldered to the flange 4 of the cap, along their line of union, as shown at 10.

Located within the inner casing 9 is a cylindrical jacket 12, of mica, or other insulating material. About this inner jacket 12, a coil 14 of German silver, or other material having a high resistance to the passage of electricity, is wound. Another cylindrical jacket 11 of mica or the like is interposed between the coil 14 and the inner surface of the inner casing 9, the coil 14 being thus isolated electrically from the casing 9. A bottom plate 15, of mica or the like, rests upon the portion 25 of the inner casing 9, and thus the resistance coil 14 is prevented from coming into contact with the inner casing 9 at the lower end thereof.

One terminal 16 of the resistance coil 14 is carried through an opening 17 in a plug 20, preferably fashioned from porcelain, and fitted tightly into the open end of the inner casing 9, the upper extremity of the inner casing 9 being, if desired, overbent as at 21, upon the upper face of the plug 20. The other terminal of the resistance coil 14 extends upwardly from the bottom of the coil, and it passes through another opening 19 in the plug 20, this last mentioned terminal of the resistance coil being denoted by the numeral 18. The terminals of the coil are united into a single cable, denoted by the numeral 22, this cable 22 passing through the neck 7 of the cap. A cylinder of insulating material, denoted by the numeral 23, is inserted into the neck 7, so that there may be no possible leakage of electricity between the cable 22 and the neck 7. The extremity of the cable 22 is provided with a socket 24 of any desired construction, whereby the device may be connected with a suitable source of electric supply.

It is to be noted that when the cap, comprising the top 5 and the flange 4 is rotated, the cap may readily be removed from the outer casing 1, the heat unit, as an entity, being thus removed for repairs or the like, from the outer casing 1 whereby it is inclosed. The plug 20 which is closely fitted into the upper end of the inner casing 9 prevents the possibility of any liquid finding its way into the interior of the said casing. It will thus be seen that the liquid to be heated cannot pass through the top of the structure into the interior thereof. By reason of the fact that the casings 1 and 9 are spaced apart, the liquid which is to be heated will circulate freely through the perforations 8. The inner casing 9 is heated to a high degree by the resistance coil 14, and the outer casing 1 is likewise heated to a considerable degree, so that the liquid which passes through the perforations 8, circulates, in reality, between two heated walls, thereby causing a rapid rise in the temperature of the liquid.

By reason of the fact that the flange 4 of the cap is threaded into the interior of the outer casing 1, and by reason of the further fact that the inner casing 9 is inserted into the interior of the flange 4 of the cap, this flange 4 of the cap constitutes a means for spacing the casings apart.

The resistance coil 14 may readily be wound about the inner insulating jacket 12, and when the coil is thus formed, the coil and the inner jacket 12 may be positioned within the outer jacket 11. The outer jacket 11 of course serves to insulate the resistance coil 14 from the inner casing 9, and the inner jacket 12 not only constitutes the form upon which the resistance coil 14 is fashioned, but, as well, prevents the coil from being short-circuited through contact between the terminal 18 which rises from the bottom of the coil, and any of the convolutions of the coil. It is to be noted, moreover, that all of the electrically charged portions of the device are thoroughly insulated, so that there will be no possibility of the person using the device receiving a shock, either from contact with some portion of the coil, or by contact with the liquid which is being heated, it being noted that it is impossible for the liquid to come into contact with any portion of the charged resistance coil, whereby the liquid itself might become charged.

Having thus described the invention, what is claimed is:—

A device of the class described comprising an outer casing; a cap hermetically closing one end of the casing and having a flange engaged within the casing, the cap having a reduced, tubular neck constituting a handle for inserting the device into the liquid to be heated; an inner casing inserted within the flange; a plug inserted into the inner casing, the plug being housed by the cap; an insulating jacket within the inner casing, the upper end of the inner casing being extended over the plug to bind the same against the end of the jacket; a resistance coil disposed about the jacket and having its terminals extended in spaced relation through the plug, the plug and the cap being spaced apart to permit the terminals of the coil to be united for insertion through the neck.

In testimony that we claim the foregoing as our own, we have hereto affixed our signatures in the presence of two witnesses.

CHAS. O. FARRINGTON.
H. M. HILL.

Witnesses:
T. M. BRENT,
J. F. CONN.